United States Patent
Jonsson et al.

(10) Patent No.: US 10,462,690 B2
(45) Date of Patent: Oct. 29, 2019

(54) RLC STATUS REPORTING FOR EIGHT-CARRIER HSDPA

(75) Inventors: Anders Jonsson, Täby (SE); Namir Lidian, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 760 days.

(21) Appl. No.: 13/283,246

(22) Filed: Oct. 27, 2011

(65) Prior Publication Data

US 2013/0034014 A1 Feb. 7, 2013

Related U.S. Application Data

(60) Provisional application No. 61/515,472, filed on Aug. 5, 2011.

(51) Int. Cl.
| | | |
|---|---|---|
| *H04W 24/00* | (2009.01) | |
| *H04W 24/10* | (2009.01) | |
| *H04L 1/18* | (2006.01) | |
| *H04W 28/02* | (2009.01) | |

(52) U.S. Cl.
CPC .......... *H04W 24/10* (2013.01); *H04L 1/1825* (2013.01); *H04L 1/1848* (2013.01); *H04L 1/1854* (2013.01); *H04W 28/0205* (2013.01)

(58) Field of Classification Search
CPC .............. H04W 24/10; H04W 28/0205; H04L 1/1848; H04L 1/1854; H04L 1/1825
See application file for complete search history.

(56) References Cited

U.S. PATENT DOCUMENTS

| | | | | |
|---|---|---|---|---|
| 5,044,365 A | * | 9/1991 | Webb | ................. A61N 1/36585 600/595 |
| 6,559,794 B1 | * | 5/2003 | Nakajima | .............. G01C 21/20 342/357.31 |

(Continued)

FOREIGN PATENT DOCUMENTS

| | | |
|---|---|---|
| CN | 1848707 A | 10/2006 |
| CN | 1989721 A | 6/2007 |

(Continued)

OTHER PUBLICATIONS

3GPP TS 25.322 v10.1.0 (Radio Link Control (RLC) protocol specification, Jul. 2011).*

(Continued)

*Primary Examiner* — Mandish K Randhawa
(74) *Attorney, Agent, or Firm* — Coats & Bennett, PLLC

(57) ABSTRACT

Techniques for signaling radio link control (RLC) status reports to a wireless network, such as a network supporting multi-carrier High-Speed Downlink Packet Access (HSDPA). An example method performed in a mobile terminal comprises calculating a throughput estimate data transmissions to the mobile terminal, determining a rate at which to send radio link control status reports, based on the throughput estimate, and sending radio link control status reports to the wireless network node at the determined rate. In some embodiments, the mobile terminal determines the rate at which to send radio link control status reports by comparing the throughput estimate to a threshold value and selecting the rate based on the comparison. The threshold value may be received from the wireless network node prior to the comparison.

33 Claims, 5 Drawing Sheets

(56) References Cited

U.S. PATENT DOCUMENTS

| | | | | |
|---|---|---|---|---|
| 2002/0078132 | A1* | 6/2002 | Cullen | G06F 9/546 709/201 |
| 2003/0012222 | A1* | 1/2003 | Rinchiuso | H04L 1/0002 370/468 |
| 2005/0276317 | A1* | 12/2005 | Jeong | H04B 7/0689 375/213 |
| 2006/0013257 | A1 | 1/2006 | Vayanos | |
| 2009/0181703 | A1* | 7/2009 | Jiang | H04L 1/1607 455/466 |
| 2010/0067396 | A1* | 3/2010 | Cui et al. | 370/252 |
| 2010/0303054 | A1* | 12/2010 | Yang | H04L 1/1825 370/345 |

FOREIGN PATENT DOCUMENTS

| | | |
|---|---|---|
| EP | 1263160 A1 | 12/2002 |
| EP | 1575204 A2 | 9/2005 |
| EP | 1686753 A1 | 8/2006 |
| EP | 1575204 A3 | 5/2012 |
| WO | 03069838 A1 | 8/2003 |
| WO | 2006104341 A2 | 10/2006 |
| WO | 2010060108 A2 | 5/2010 |
| WO | 2010060108 A3 | 5/2010 |

OTHER PUBLICATIONS

Qualcomm, "RLC Status Reporting Enhancement," 3GPP TSG-RAN WG2 meeting #45bis, Jan. 10-14, 2005, Sophia Antipolis, France, R2-050095.

3rd Generation Partnership Project, Source Ericsson, St-Ericsson, "[Draft] Varying RLC Status Reporting for 8C-HSDPA," Change Request Form 25.331 CR CRNum, v. 10.4.1, 3GPP TSG-RAN WG2 #75bis, R2-11xxxx, Zhuhai, P.R. of China, Oct. 10-14, 2011.

3rd Generation Partnership Project, "Varying RLC Status Reporting for 8C-HSDPA," 3GPP TSG-RAN WG2 Meeting #75bis, R2-11xxxx, Zhuhai, P.R. of China, Oct. 10-14, 2011.

3GPP. "3rd Generation Partnership Project; Technical Specification Group Radio Access Network; Radio Resource Control (RRC); Protocol specification (Release 10)." 3GPP TS 25.331 V10.4.0. Jun. 2011. 3GPP, Sophia Antipolis, France.

3GPP. "3rd Generation Partnership Project; Technical Specification Group Radio Access Network; Radio Link Control (RLC) protocol specification (Release 10)." 3GPP TS 25.322 V10.1.0. Jun. 2011. 3GPP, Sophia Antipolis, France.

Search report, application No. CN201280038117.8, dated Apr. 20, 2016. SIPO, Beijing, CN.

* cited by examiner

RLC STATUS REPORTING FOR EIGHT-CARRIER HSDPA

RELATED APPLICATION

This application claims priority to U.S. provisional patent application Ser. No. 61/515,472, filed 5 Aug. 2011.

TECHNICAL FIELD

The present invention generally relates to communication systems, and more particularly relates to techniques for controlling the reporting of radio link control (RLC) protocol status in such systems.

BACKGROUND

In the period from its publication of its Release 8 specifications (Rel-8) to its development of Release 10 specifications (Rel-10), the $3^{rd}$ Generation Partnership Project (3GPP) has introduced increasing degrees of support for multi-cell downlink transmissions for High-Speed Downlink Packet Access (HSDPA), alternatively known as multi-carrier HSDPA. Dual-Cell HSDPA (DC-HSDPA) operation, whereby the network could schedule simultaneous transmissions on two adjacent downlink carriers to a mobile terminal (known as User Equipment, or UE, in 3GPP terminology), was standardized in Rel-8. In Rel-9, support for DC-HSDPA in combination with multiple-input multiple-out (MIMO) transmissions was introduced, along with support for Dual-Band DC-HSDPA. The former technique provides a peak data rate of 84 Mbps, while the latter extends the Rel-8 DC-HSDPA feature so that the two configured downlink carriers can be located in different frequency bands.

In Rel-10, 3GPP introduced four-carrier High-Speed Downlink Packet Access (4C-HSDPA) operation, which provides peak downlink data rates of 168 Mbps. Currently, 3GPP is developing support for eight-carrier High-Speed Downlink Packet Access (8C-HSDPA) for standardization in Release 11 of the 3GPP specifications (Rel-11). This technique, whereby as many as eight carriers can be simultaneously used to transmit data to a single UE, will allow peak data rates up to about 336 Mbps.

Many packet data systems, including wireless systems that support HSDPA, support an acknowledged mode transmission of data, in which an ARQ (Automatic Repeat Request) mechanism is used to trigger the retransmission of defective or lost data packets. This acknowledged mode of data transmission is part of the Radio Link Control (RLC) protocol, which is specified for 3GPP systems in "3rd Generation Partnership Project; Technical Specification Group Radio Access Network; Radio Link Control (RLC) protocol specification (Release 10)," 3GPP TS 25.322, v 10.1.0 (June 2011). The 3GPP RLC protocol is also more generally described in U.S. Pat. No. 7,870,259, "Method and Transmitter for an Efficient Packet Data Transfer in a Transmission Protocol with Repeat Requests," the entire contents of which are incorporated herein by reference to provide technical background and context for the inventive techniques, as well as to introduce the devices, methods, and techniques that may be adapted according to the detailed techniques described herein.

Currently, several aspects of the RLC specifications for HSDPA limit the achievable downlink throughput, i.e., the data transfer rates from the base station to mobile terminals or, in 3GPP terms, from the Node B to UEs. More particularly, downlink throughput at the RLC layer is limited by the RLC Sequence Number (SN) space and the maximum configurable size for a RLC Protocol Data Unit (PDU). As a result, the maximum data rates possible with eight-carrier HSDPA (8C-HSDPA) cannot be supported at the RLC layer without RLC timer settings that can otherwise result in a detrimental impact to user and cell capacity. Accordingly, improved RLC techniques are needed.

SUMMARY

Described herein are several techniques for signaling radio link control (RLC) status reports to a wireless network, as well as complementary techniques for controlling the signaling of RLC status reports. Embodiments of the present invention thus include various methods, performed by a mobile terminal (e.g., a 3GPP UE), or by a Radio Network Controller (RNC), or some combination thereof. More generally, these methods may be carried out at an RLC receiver, RLC transmitter, or some combination thereof. Other embodiments include devices or apparatus configured to carry out all or part of one or more of these methods, e.g., with appropriate processing circuits, network interface circuits, and software and/or firmware.

For instance, an example method performed in a mobile terminal or, more generally, at the receiving end of a high data-rate link, comprises calculating a throughput estimate data transmissions to the mobile terminal, determining a rate at which to send radio link control status reports, based on the throughput estimate, and sending radio link control status reports to the wireless network node at the determined rate.

In some embodiments, the mobile terminal determines the rate at which to send radio link control status reports by comparing the throughput estimate to a threshold value and selecting the rate based on the comparison. In some embodiments, the threshold value is received from the wireless network node prior to the comparison. In an HSDPA network, this threshold value can comprise a TSP_Change_Threshold received from an RNC via an HSDPA Node B. In some embodiments, the rate at which to send radio link control status reports is selected from at least two timer-status-prohibit values, such as a Timer_Status_Prohibit_low value and a Timer_Status_Prohibit_high value. One or both of the values may be received from the wireless network prior to the selection.

In some embodiments, rather than using a threshold value to select the rate, the rate at which to send radio link control status reports is determined by calculating the rate as a function of the estimated throughput and at least one timer-status-prohibit value. In some of these embodiments, for example, the rate is calculated by varying the rate linearly between two timer-status-prohibit values, as a function of the estimated throughput. In some of these embodiments, the at least two timer-status-prohibit values are received from the wireless network node prior to this calculation. In other embodiments, the rate is calculated by deviating from a single pre-determined timer-status-prohibit value as a function of the estimated throughput.

In several of the embodiments described above, the throughput estimate is calculated by calculating an actual radio link control throughput based on data sent to the mobile terminal. In others, the throughput estimate is calculated by estimating a radio link control throughput based on one or more transport block sizes for data sent to the mobile terminal.

Corresponding methods for controlling the transmission of radio link control status reports from one or more mobile terminals, such as might be performed in an RNC, are also disclosed. One example method of this sort includes signaling a throughput threshold value to one or more mobile terminals, and receiving radio link control status reports from the one or more mobile terminals at a plurality of rates, depending on downlink data throughputs for the one or more mobile terminals. Some embodiments further comprise signaling at least one timer-status-prohibit value to the one or more mobile terminals, for use in determining status reporting rates. In some of these embodiments, two timer-status-prohibit values are signaled to the one or more mobile terminals, and each of the plurality of rates corresponds to one or the other of the two timer-status-prohibit values. In a variation of these latter embodiments, each of the plurality of rates corresponds to a timer value in a range extending from the one of the two timer-status-prohibit values to the other.

Mobile terminal and network node apparatus corresponding generally to the methods summarized above are also disclosed, these apparatus including processing circuits configured to carry out one or more of the techniques described herein for signaling radio link control status reports to a wireless network node and for controlling the transmission of radio link control status reports from one or more mobile terminals.

One advantage flowing from various embodiments of the techniques described herein is that these techniques allow both the higher bit rates associated with 8C-HSDPA while ensuring that the loss of uplink capacity associated with frequent uplink status reporting is minimized. One problem with a short TSP setting is that the frequently transmitted uplink RLC status reporting increases the unnecessary uplink bit rate which, given that the uplink is non-orthogonal, creates unnecessary cell interference. This in turn decreases cell capacity. However, the approaches described herein can be used to ensure that the majority of the RLC status reporting in the cell will be done at a relatively low rate, while the short TSP setting is used only in high downlink bit rate scenarios which involve just one or very few users. Another advantage to several of the approaches described above is that only minor modifications to the 3GPP standard are required.

Of course, those skilled in the art will appreciate that the present invention is not limited to the above features, advantages, contexts or examples, and will recognize additional features and advantages upon reading the following detailed description and upon viewing the accompanying drawings.

DETAILED DESCRIPTION

Figure 1:
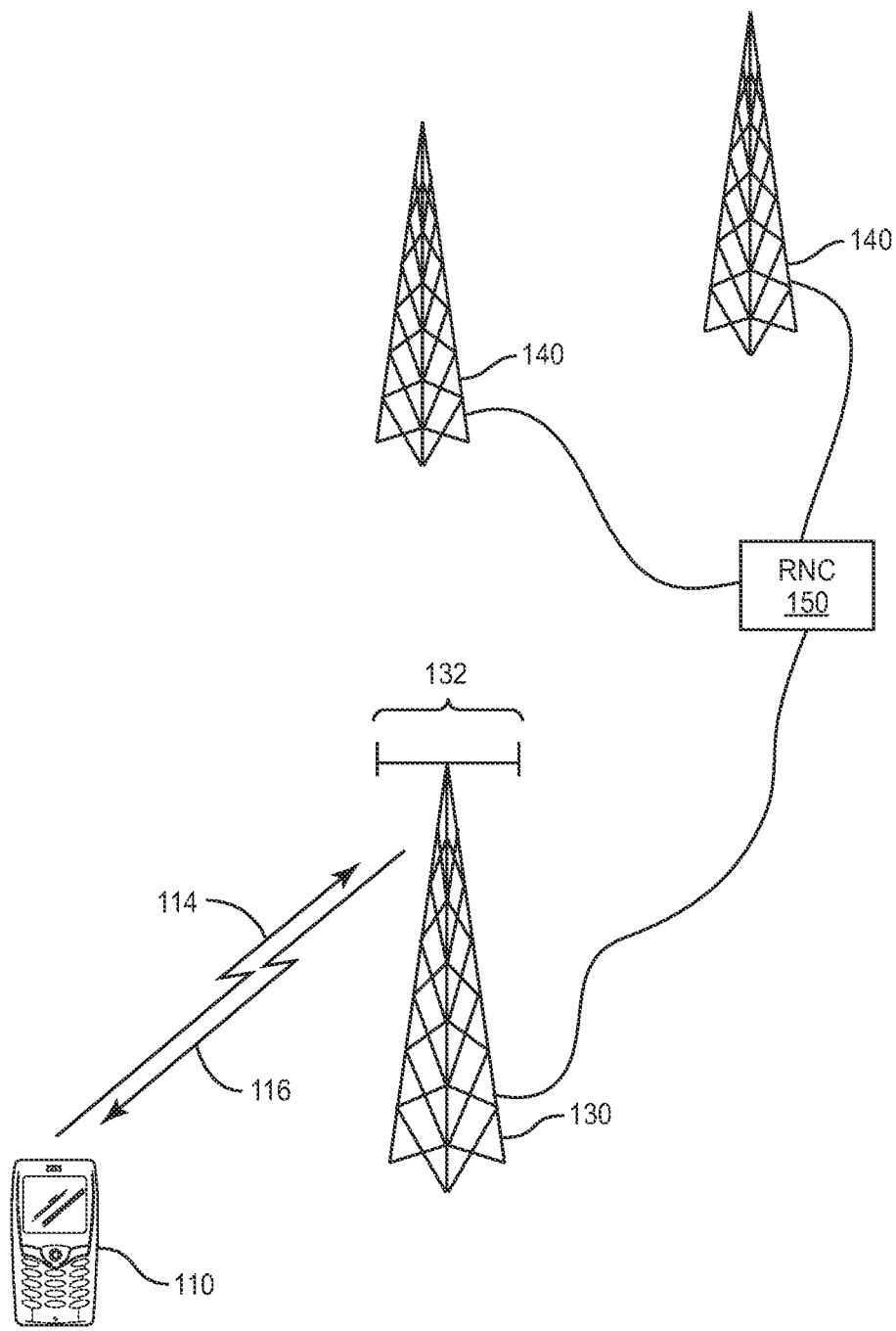
FIG. 1 is a block diagram of an example wireless network.

Various embodiments of the present invention are now described with reference to the drawings, where like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

While the following discussion focuses on Radio Link Control (RLC) signaling in a High-Speed Packet Access (HSPA) system, the techniques described herein can be applied to various wireless communication systems configured for multi-carrier support, including those that use code division multiple access (CDMA), time division multiple access (TDMA), frequency division multiple access (FDMA), orthogonal frequency division multiple access (OFDMA), single carrier-frequency division multiple access (SC-FDMA), or other radio access and modulation schemes. CDMA-based systems include those that are based on specifications for Universal Terrestrial Radio Access (UTRA), CDMA2000, etc. UTRA in turn includes Wideband-CDMA (W-CDMA) and other variants of CDMA, whileCDMA2000 includes IS-2000, IS-95 and IS-856 standards. Well-known TDMA systems include the Global System for Mobile Communications (GSM), while systems based on OFDMA include Evolved UTRA (E-UTRA), Ultra Mobile Broadband (UMB), IEEE 802.11 (Wi-Fi), IEEE 802.16 (WiMAX), IEEE 802.20, Flash-OFDM, etc.

FIG. 1 illustrates components of a wireless network 100, including mobile terminals 110 and base stations 130 and 140. Base station 130 communicates with mobile terminals 110 and 120 via one or more antennas 132; individual ones or groups of these antennas are used to serve pre-defined sectors and/or to support any of various multi-antenna transmission schemes, such as multiple-input multiple-output (MIMO) transmission schemes. In the system illustrated in FIG. 1, mobile terminal 110 communicates with base station 130 over an uplink (mobile terminal-to-base station link) 114 and a downlink (base station-to-mobile terminal link) 116.

RNC 150 is responsible for controlling the base stations (Node Bs) 130 and 140 that are connected to it. More particularly, the RNC carries out radio resource management, mobility management functions, and encrypts user data sent to and from the mobile. RNC 150 connects to the SGSN (Serving GPRS Support Node, not shown) in the packet-switched core network.

Several of the embodiments are described herein in connection with a wireless transceiver in a radio access terminal, such as the mobile terminal 110 illustrated in FIG. 1. A radio access terminal, which communicates wirelessly with fixed base stations in the wireless network, can also be called a system, subscriber unit, subscriber station, mobile terminal, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. The terms UE and mobile terminal are used herein to refer to any of these devices.

Similarly, various embodiments are described herein in connection with a radio network controller (RNC), such as the RNC 150 illustrated in FIG. 1. Although the RNC 150 illustrated in FIG. 1 and discussed herein is described and illustrated as though it is a single physical entity, those skilled in the art will recognize that various physical configurations are possible, including those in which the functional aspects discussed here are split between two physically separated units, or combined in a network node that is configured to carry out other network functions, such as a NodeB. Thus, the term "RNC" is used herein to refer to a collection of functional elements, including processing circuits and communication circuits configured to carry out radio link control (RLC) operations, which may or may not be implemented as a single physical unit.

The specifications for HSDPA include support for an acknowledged mode, which relies on an ARQ (Automatic Repeat Request) mechanism at the RLC protocol layer. This acknowledged mode provides the possibility to retransmit data packets which are defective, either because they are lost or because they have been received in error. In this way, a loss-free data transmission can be ensured at the RLC layer, even when some data packets are defective because of a radio link disturbance, for example. At the RLC layer, these data packets are known as RLC Protocol Data Units (PDUs), and are identified by a sequence number (SN). The SN is represented by a limited number of bits, so the SNs are assigned to the RLC PDUs on a modulo, i.e., repeating, basis. Messages from the data receiver (the UE, in the HSDPA case) to the data transmitter (the RNC, in the HSDPA) indicate which PDUs have been received and which need to be retransmitted.

The status of transmitted and received data packets can be controlled using receiver and transmission windows in the receiver and the transmitter, respectively. These windows are effectively memories in which the status of PDUs, i.e., whether each has been acknowledged or not, is stored.

In the RLC protocol, the messages indicating ACKed and NACKed data packets are denoted as status reports and may consist of one or several RLC PDUs. The status report includes information about all PDUs that have been received and all PDUs detected as defective, as of the time when the status report is generated.

To improve the protocol performance in terms of delay and throughput optimization it is necessary that retransmissions of erroneously received radio link control protocol data units are sent as soon as possible. However, fast retransmissions may result in several retransmissions of the same PDU, which is a waste of resources. If several status reports are received within one RLC round-trip-time (RTT), i.e., the time needed for an RLC PDU to travel from the RNC to the UE, and back, each may trigger the retransmission of the same defective protocol data unit, because all negatively acknowledged protocol data units are retransmitted when the transmitter receives a status report. Especially if status reports are sent as often as possible, this may speed up the protocol but triggers unnecessary, and wasteful, retransmissions.

The RLC protocol allows the control of status reporting via a Status Prohibit Timer. This timer prohibits the sending of status reports for a certain amount of time. If the Status Prohibit Timer is set to a value higher than the RLC round trip time, unnecessary retransmissions are prevented. One disadvantage of infrequent status reporting is that this slows down the retransmission of erroneous data packets significantly and results in a slow protocol, especially if there are a high proportion of defective packets and/or the round trip time is high.

If the RLC RTT is too large, or the RLC PDU size is too small, or the transmission window is too small, or status reports are not sent frequently enough, a problem called "stalling" can occur. In a stalled window, all available positions (SNs) correspond to PDUs that have been transmitted but have not yet been successfully received. The window cannot be shifted, and new data packets cannot be sent, until the oldest defective data packet is acknowledged. This blocks, or "stalls," the data transmission until the status of the oldest PDU is resolved. Stalling can occur when an insufficiently-sized modulo sequence numbering is used, i.e., when the "space" or number of bits used in the SN is too small.

The current 3GPP specifications for Wideband-CDMA (WCDMA) set the RLC SN space to 12 bits and the maximum RLC PDU size to 1504 octets. (See 3GPP TS 25.322, "3rd Generation Partnership Project; Technical Specification Group Radio Access Network; Radio Link Control (RLC) protocol specification (Release 10)," v 10.1.0 (June 2010), §§ 9.2.2.3, 9.2.2.8.) Given these limitations, the RLC layer cannot support bit rates of up to 336 Mbps and throughput will be limited by the RLC layer due to RLC window stall, unless uplink RLC status reporting is done at a higher rate than the RLC Round Trip Time (RTT).

As suggested above, an RLC window stall is characterized by an intermittent transmission of data from the transmitting RLC entity and can result when the product of the RLC PDU size and RLC transmission window is too small or when status reports from the receiving RLC entity are sent too infrequently. Given that the 3GPP Release 10 specifications limit the SN parameter size to 12 bits, which limits the number of possible PDU sequence numbers to only 4095, the maximum RLC window size that can be set without the risk of protocol ambiguities under certain scenarios is 2047 PDUs. If the SN space and maximum RLC PDU size remain unchanged, then the uplink RLC status reports (i.e., status reports sent from the UE to the RNC) need to be sent at a rate higher than the RLC RTT to avoid RLC window stall.

One way to address this problem is to increase the SN space, e.g., from 12 to 14 bits. Another way is to increase the maximum RLC PDU size, e.g., to at least 15,000 bits. However, both these changes have the drawback that they require substantial changes to the standard. Still another is to decrease the Timer Status Prohibit (TSP) timer to a value less than or significantly lower than the RLC RTT, e.g., on the order of 10 milliseconds. As noted above, however, this can trigger extra, unnecessary retransmissions.

In several embodiments of the present invention, these problems with RLC throughput in wireless networks supporting 8C-HSDPA are addressed by allowing the network to configure the UE to use at least two values of TSP, under different circumstances. In some embodiments, one of these values, a longer TSP value, is used when the throughput from the RNC to the UE is low, while another, shorter, value is used for high throughput rates. In some embodiments, the network determines at which throughput rate the UE shall switch between the different TSP values. To facilitate this approach, new parameters can be introduced into section 10.3.4.1 of the 3GPP specifications for Radio Resource Control (RRC), 3GPP TS 25.331, "3rd Generation Partnership Project; Technical Specification Group Radio Access Network; Radio Resource Control (RRC); Protocol specification (Release 10)," v 10.4.0 (June 2011).

More particularly, some embodiments use a new parameter corresponding to a threshold value for selecting among TSP values. In the remainder of the present discussion, this threshold value is referred to as "TSP_Change_Threshold." In addition, there is a need to replace the currently signaled TSP parameter "Timer_Status_Prohibit" with two new parameters, which are referred to in the remainder of this disclosure as "Timer_Status_Prohibit_low" and "Timer_Status_Prohibit_high" respectively. The first of these parameters is used to establish a relatively low rate for status reporting (corresponding to a relatively long value for the TSP timer), while the second is used to establish a relatively high rate (corresponding to a relatively shorter value for the TSP timer). Of course, different names for any of these new parameters may be used in future 3GPP specifications and/or in other system specifications and any of a variety of formats may be used for storing and/or signaling one or more of these values to a mobile terminal.

In some systems using this approach, the network signals these three values, Timer_Status_Prohibit_high, Timer_Status_Prohibit_low and TSP_Change_Threshold, to the UE. The network uses, for example, the signaling information element (IE) "Downlink RLC STATUS info" that is currently defined in 3GPP TS 25.322. The UE then stores these values.

In a system using any of the above approaches, while the network (e.g., the RNC) signals one or more parameters to the UE, the UE actually selects the rate at which the RLC status reports are to be sent, based on an estimate of the downlink throughput to the UE. The UE may use one or more pre-stored parameters (e.g., a parameter value established by standardization) along with the signaled parameter values, in some embodiments.

Figure 2:
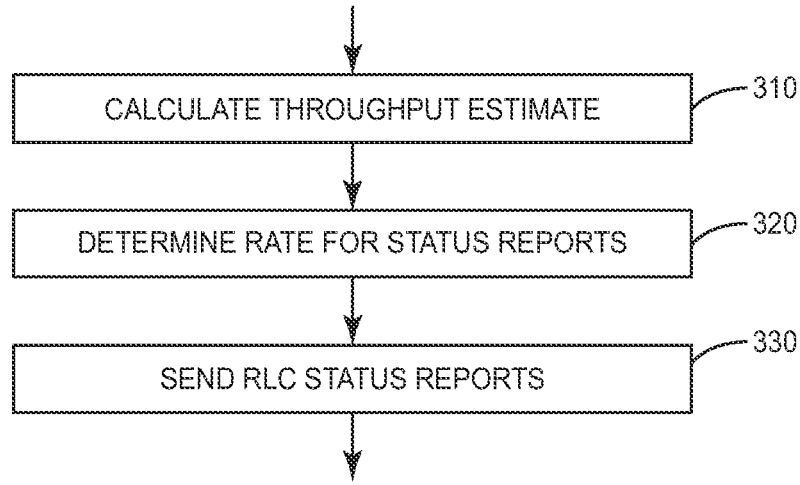
FIG. 2 is a process flow diagram illustrating an example method for signaling radio link control (RLC) status reports to a wireless network node.

FIG. 2 illustrates generally the process carried out by the UE. First, as shown at block 210, the UE calculates a throughput estimate for downlink data transmissions to the UE. As will be discussed in further detail below, this throughput estimate can be based on an accurate count of RLC data payloads, or can be a somewhat less precise estimate based on the transport block size used to carry the downlink data.

As shown at block 220, the UE then determines a rate at which to send the RLC status reports to the network, based on the throughput estimate. Several different approaches to selecting the RLC status report rate are possible, several of which are detailed below. It will be appreciated that determining a TSP value, which is a timer value corresponding to an elapsed time between reports, is equivalent to selecting a frequency of reporting. Thus, the phrase "determining a rate," as used herein, refers to either or both of these operations, i.e., to selecting a time between rate reports or to selecting a frequency of reporting.

Finally, as shown at block 230, the UE sends RLC status reports at the determined rate. As described earlier, these RLC status reports inform the RNC (or other network element) of which PDUs have been successfully received, and which have not.

In various embodiments, the UE calculates a throughput estimate for downlink data transmission and compares this estimated value to the value of TSP_Change_Threshold. Based on this comparison, the UE determines at which rate to send RLC status reports. Thus, if the throughput estimate is lower than the TSP_Change_Threshold, the UE sends RLC status reports at a frequency determined by Timer_Status_Prohibit_low. If the throughput is higher than the threshold value, the UE uses the timer value associated with Timer_Status_Prohibit_high.

Figure 3:
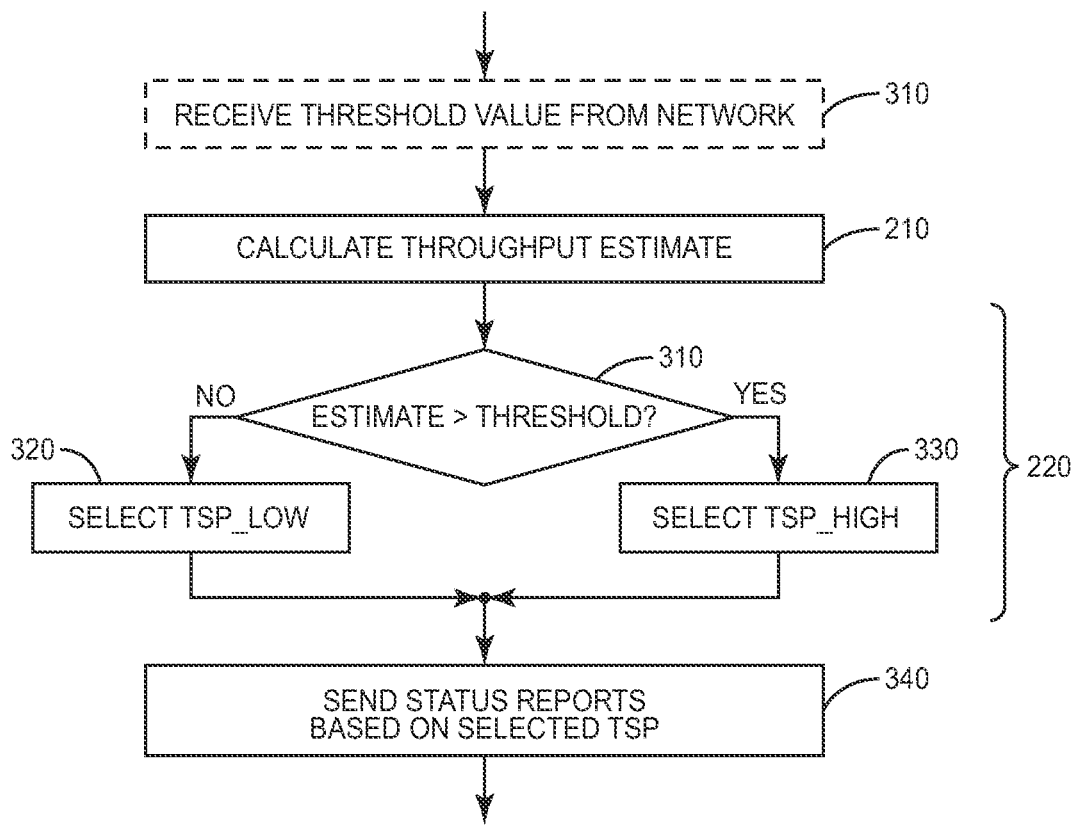
FIG. 3 illustrates details of some embodiments of the process of FIG. 2.

This approach is shown in FIG. 3. As shown at block 310, the UE receives a threshold value, e.g., a TSP_Change_Threshold parameter, indicating a throughput rate at which the UE should switch between RLC status reporting rates. Because the threshold value can be a statically programmed value, in some embodiments, the step of receiving this value from the network does not appear in all embodiments and is thus indicated as optional (enclosed in dashed lines) in FIG. 3.

Next, the UE calculates a throughput estimate for downlink data sent to the UE, as shown at block 210. This operation corresponds directly to the "Determine Rate for Status Reports" block illustrated in FIG. 2. The UE then compares the throughput estimate to the threshold value, as shown at block 310. If the estimate is greater than the threshold value, indicating a relatively high downlink throughput rate, the UE selects a relatively high TSP value, e.g., TSP_HIGH, as shown at block 330. This corresponds to a relatively lower frequency for RLC status reporting. On the other hand, if the estimate is lower than the threshold value, indicating a relatively low downlink throughput rate, the UE selects a relatively low TSP value, e.g., TSP_LOW, as shown at block 320. This corresponds to a relatively higher frequency for RLC status reporting. Finally, as shown at block 340, RLC status reports are sent to the network, based on the selected TSP value.

In one example system scenario embodying the approach illustrated in FIG. 3, the network could configure a UE to have a Timer_Status_Prohibit_high value of 10 milliseconds, a Timer_Status_Prohibit_low value to 70 milliseconds, and a TSP_Change_Threshold set to 200 Mbps, for a scenario in which 8C-HSDPA, with a peak rate of 336 Mbps, is supported. Different values can be configured for different UEs, and different values can be assigned to the same UE at different times.

Figure 4:
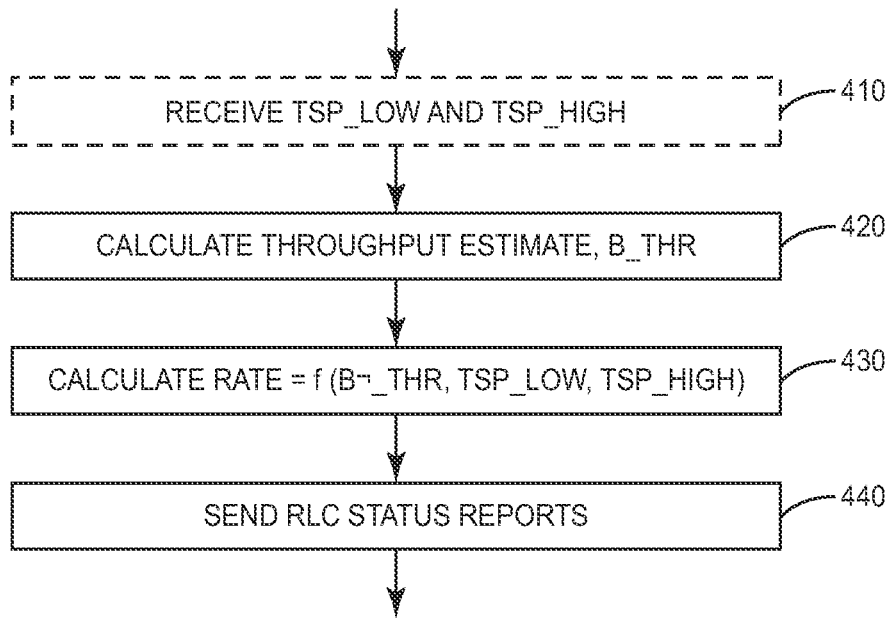
FIG. 4 illustrates details of some embodiments of the process of FIG. 2.

Blocks 310, 320, and 330 of FIG. 3 correspond to block 220 of FIG. 2, illustrating one possible approach to determining a specific rate for RLC status reporting. Another approach is illustrated in FIG. 4, which begins, as shown at block 410, with receiving two timer values, TSP_LOW and TSP_HIGH, from the network (e.g., from the RNC). In FIG. 4 this step is illustrated as optional (enclosed by a dashed line) because either or both of these values can be a statically programmed value in the UE, in some embodiments.

As shown at block 420, the UE then calculates a throughput estimate, B_THR. The throughput estimate performed in the UE can either be a more precisely calculated value of the actual RLC throughput, or simply an estimate based on the transport block (TB) size for the data sent to UE, in various embodiments. An estimation based on TB size has the advantage that it is easily derived and requires less processing in UE.

In either case, the throughput estimate is used, along with the high and low timer values, to calculate an RLC status reporting rate, as shown at block 430. As shown at block 440, RLC status reports are sent, using the calculated rate.

In some embodiments of the approach illustrated in FIG. 4, the network signals only the Timer_Status_Prohibit_high and Timer_Status_Prohibit_low values to the UE. Rather than using a threshold against which an estimated throughput is compared, as in the process illustrated in FIG. 3, the UE may instead be configured to vary the TSP reporting rate linearly between these values, as a function of the throughput. For instance, the UE may calculate a TSP value for use in status reporting as follows:

$$TSP_{CALC} = TSP\_LOW + \frac{B\_THR - B_0}{B_{MAX} - B_0}(TSP\_HIGH - TSP\_LOW),$$

where $B_{MAX}$ and $B_0$ are high and low reference throughput rates, respectively. $B_{MAX}$, and $B_0$ may be statically configured, in some embodiments, or signaled to the mobile terminal in others.

Of course, the linear calculation of a timer value given above is only one example of a possible calculation. Mapping an estimated throughput to a TSP timer value may use a different function, including a non-linear function, instead; while readily implemented, the linear variation is just one possible embodiment.

Several of the embodiments described above require that the standard defining the WCDMA Radio Resource Control (RRC) signaling (3GPP TS 25.322) be updated for Release 11 to allow the RNC to configure the UE with one or more values of TSP, and possibly also to signal a threshold value to the UE. Another approach is to not signal any new TSP value, but to retain legacy signaling and only signal the single Timer_Status_Prohibit value, as signaled to the UE according to the current standard. In this case, it can be mandated that the UE should autonomously deviate from this predetermined value based on the estimated throughput.

This approach has the advantage that no new RRC signaling needs to be introduced. An example would be to signal the value for the TSP, e.g., TSP=70 ms, and then mandate, via the specifications, that the UE deduct a certain value or percentage of this, either as a step function or according to a continuous scheme such as a linear reduction or linear scaling. A further simplification would be to simply mandate, via the system specifications, that the UE shall use a certain predetermined TSP value, irrespective of the signaled TSP value, if and while the estimated throughput exceeds a certain predetermined threshold value. An example of this would be to mandate that the UE uses a TSP corresponding to the signaled value, e.g., 70 ms, unless the estimated value as in the example stated above exceeds 200 Mbps, in which case the UE starts using a another TSP value, such as 10 ms. This UE behavior, or variants thereof, could then be mandated in the 3GPP standard by adding a note in section 10.3.4.1 of 3GPP TS 25.331.

It should be noted that a TSP setting lower than the RLC RTT will result in multiple copies of Negatively Acknowledged (NACK) RLC PDU's being sent to the UE. Thus, if we assume an RLC RTT of 70 ms and a TSP setting of 10 ms, the UE will receive up to six additional copies of the NACK:ed RLC PDU's. This leads to an inefficient use of the available downlink bandwidth, since the additional copies will be discarded by UE. Fortunately, this may be avoided by implementing so-called Retransmission Prohibit Timer (RPT) functionality, which is described in detail in U.S. Pat. No. 7,870,259, which was incorporated herein by reference, above. RPT functionality works by limiting the number of re-transmissions of the NACKed RLC PDU's to just one copy within a time period as determined by the RPT. In the above example, an appropriate RPT setting would be approximately 80 ms, thereby blocking the transmission of the unnecessary retransmissions caused by the low TSP setting. Accordingly, any of the TSP-related techniques described herein can be advantageously combined with RPT functionality, in some embodiments of the invention.

Figure 5:
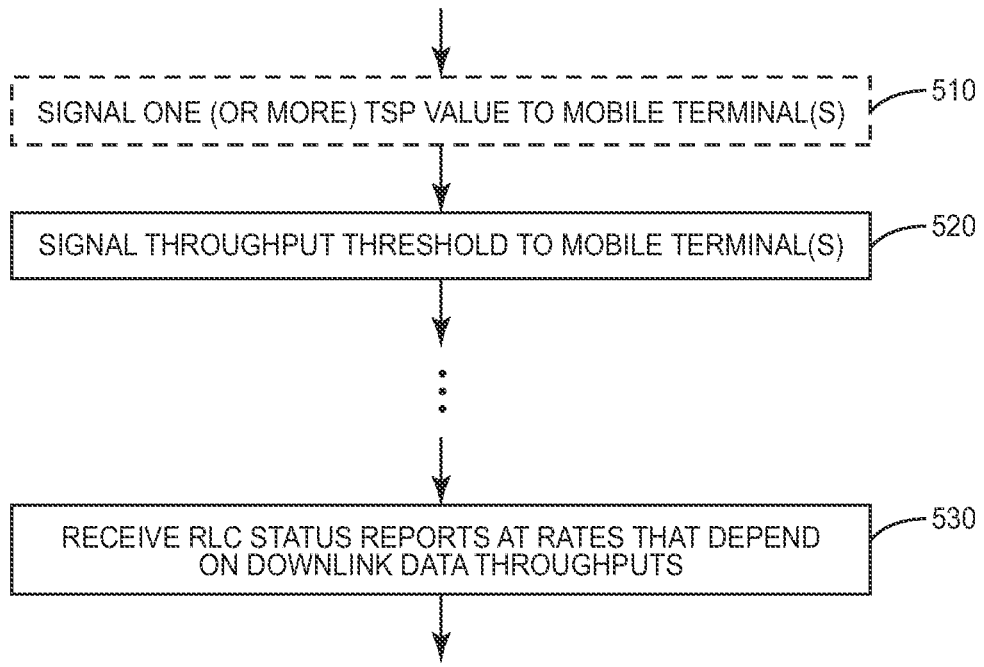
FIG. 5 is a process flow diagram illustrating an example method for controlling the transmission of radio link control status reports from one or more mobile terminals.

FIG. 5 illustrates a process implemented by a network node, such as an RNC, complementing the mobile terminal processes illustrated in FIGS. 2 and 3. As shown at block 510, the network node signals one or more timer values (TSP) to one or to a group of mobile terminals. Once more, this operation is illustrated as optional in FIG. 5 (enclosed by dotted line) because one or more timer values may be pre-programmed or otherwise statically configured in the mobile terminal, in some embodiments.

As shown at block 520, the network node signals a throughput threshold value to one or a group of mobile terminals. This throughput threshold value is the means by which the network can regulate the RLC status reporting rate, since the actual rate is selected by the mobile terminal. If the network node wishes to receive more frequent reports from one or several mobile terminals, it can send a lower threshold value to that terminal or those terminals, so that a higher RLC status reporting rate is used for a larger range of downlink throughput rates. Conversely, if the network node desires less frequent reports, it can instead send a higher threshold value.

Downlink data is then sent to the mobile terminals, according to conventional processes. The network node receives periodic RLC status reports from mobile terminals reflecting the status of those downlink transmissions, as shown at block 530. The rates at which those RLC status reports are received depend on the downlink throughput rates for the corresponding mobile terminals, as well as on the TSP values and/or throughput threshold value sent to the mobile terminals.

While the preceding discussion has focused on UE and RNC behavior relative to the downlink, to support 8C-HSDPA, it should be noted that the functionality described herein is also applicable to support higher uplink rates, which will become more and more relevant as multi-carrier technologies are increasingly applied to uplink communications. Thus, while the above discussion generally assumes a downlink scenario, the techniques can be readily applied in the opposite direction as well, by applying to an RNC, or other node or nodes performing RLC functionality, the same techniques and requirements described here for the UE. Likewise, while the techniques described above are discussed in the context of 8C-HSDPA, these techniques are by no means limited to that context, and may be applied to other system configurations or data rate scenarios in a 3GPP-based network, or in any communications system or scenario in which there is a wide range of possible data throughputs.

Figure 6:
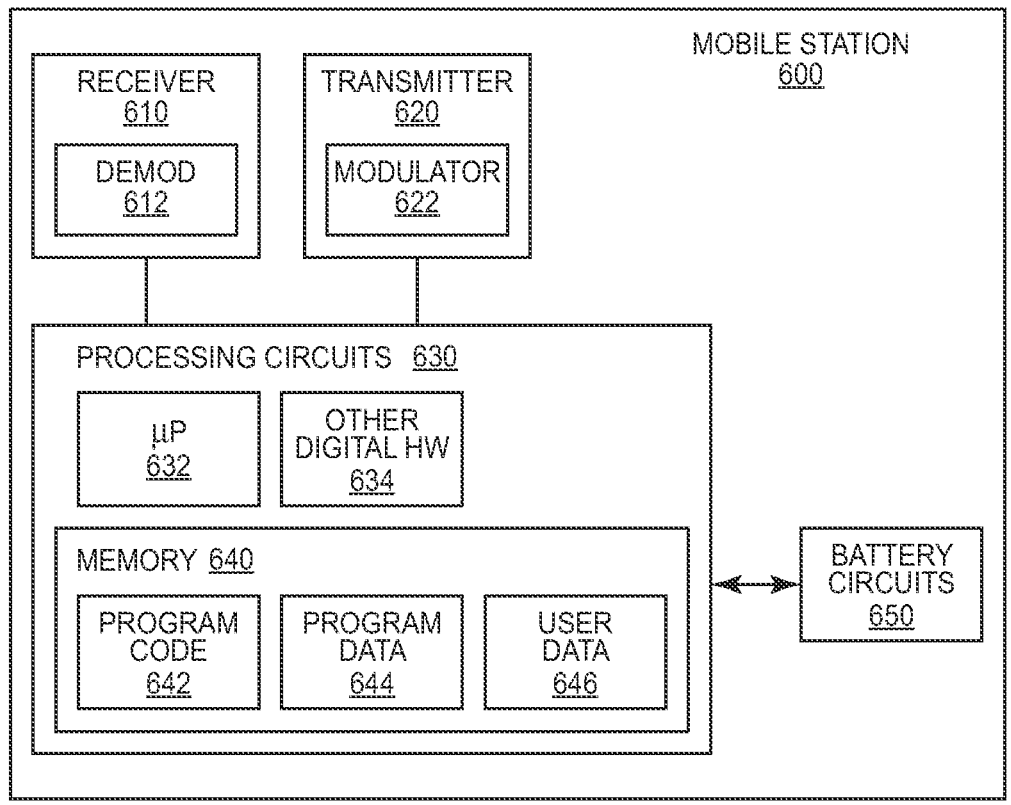
FIG. 6 is a block diagram illustrating components of a mobile terminal.

Apparatus configured to carry out the techniques described above are illustrated in FIGS. 6, 7, 8, and 9. FIG. 6 is a block diagram of a mobile terminal 600 configured to signal radio link control status reports to a wireless network node according to any of the techniques disclosed herein. In particular, mobile terminal 600 may be configured to implement the methods illustrated in FIGS. 2, 3, and/or 4, or variants thereof. Mobile terminal 600 includes a receiver circuit 610, which includes various radio-frequency components (not shown) and a demodulator circuit 612. Receiver 610 processes radio signals received from one or more wireless base station and processes the signals, using known radio processing and signal processing techniques, to convert the received radio signals into digital samples for processing by processor circuits 630. More particularly, receiver 610 is capable of receiving and processing multiple carriers simultaneously. Processing circuits 630 extract data from signals received via receiver 610 and generate information for transmission to the wireless base station via transmitter circuit 620, including ACK/NACK information and RLC status reports. Like the receiver 610 and demodulator 612, transmitter 620 and modulator 622 use known radio processing and signal processing components and techniques, typically according to one or more telecommunications standards, and are configured to format digital data and generate and condition a radio signal, from that data, for transmission over the air.

Processing circuits 630 comprise one or several microprocessors 632, digital signal processors, and the like, as well as other digital hardware 634 and memory circuit 640. Memory 640, which may comprise one or several types of memory such as read-only memory (ROM), random-access memory, cache memory, flash memory devices, optical storage devices, etc., stores program code 642 for executing one or more telecommunications and/or data communications protocols and for carrying out one or more of the techniques for signaling radio link control status reports described herein. Memory 640 further stores program data 644, user data 646 received from the wireless base station and to be transmitted to the base station, and also stores various parameters, pre-determined threshold values, and/or other program data for controlling the operation of the mobile terminal 600. Mobile terminal 600 obviously includes various other features that are not shown, in addition to the battery circuits 650 pictured in FIG. 6; these features, such as user interface circuitry, positioning circuits, and the like, are well known to those skilled in the art and are therefore not illustrated.

Figure 7:
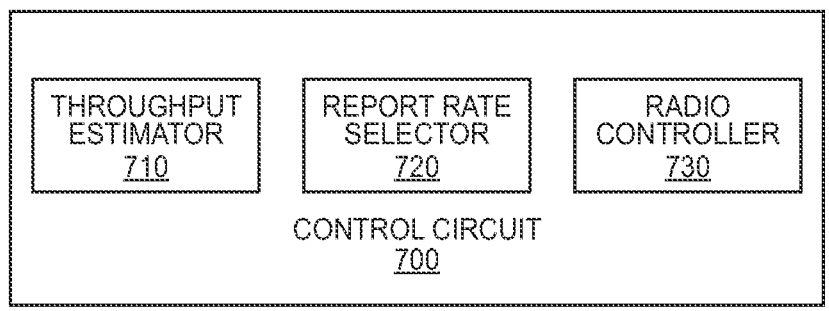
FIG. 7 illustrates a mobile terminal control circuit according to some embodiments of the present invention.

In some embodiments, processing circuits 630, using appropriate program code 642 stored in memory 640, are configured to implement one or more of the techniques described herein. Of course, not all of the steps of these techniques are necessarily performed in a single microprocessor or even in a single module. Thus, FIG. 7 presents a more generalized view of a mobile terminal control circuit 700 configured to carry out one or several of the signaling techniques discussed herein. This mobile terminal control circuit 700 may have a physical configuration that corresponds directly to processing circuits 630, for example, or may be embodied in two or more modules or units. In either case, control circuit 700 is configured with modules or sub-circuits to carry out three operations in accordance with the techniques described above. These units are pictured in FIG. 7 as throughput estimator 710, report rate selector 720, and radio controller 730.

Throughput estimator 710 calculates a throughput estimate for downlink data transmitted to the mobile terminal via multiple carriers, e.g., as many eight four HSDPA carriers in a 3GPP Release 11 system. Based on this throughput estimate, report rate selector 720 determines a rate at which to send RLC status reports. Radio controller 730 then sends RCL status reports to the wireless network at the determined rate.

Figure 8:
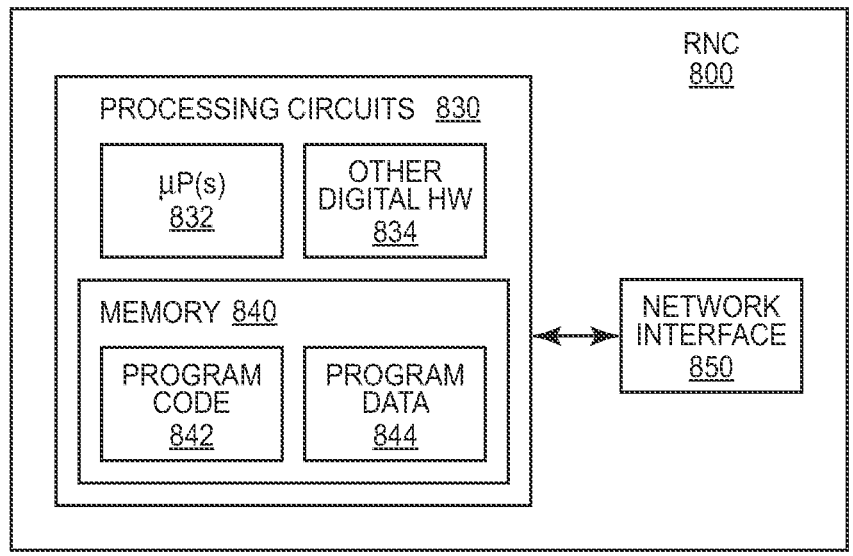
FIG. 8 is a block diagram illustrating components of a Radio Network Controller (RNC).

FIG. 8 is a block diagram of a Radio Network Controller (RNC) 800 configured to control the transmission of RLC status reports from one or more mobile terminals according to the techniques disclosed herein. In particular, RNC 800 may be configured to implement the method illustrated in FIG. 5, or variants thereof. RNC 800 includes processing circuits 830, which in turn comprise one or several microprocessors 832, digital signal processors, and the like, as well as other digital hardware 834 and memory circuit 840. Memory 840, which comprises one or several types of memory such as read-only memory (ROM), random-access memory, cache memory, flash memory devices, optical storage devices, etc., stores program code 842 for executing one or more telecommunications and/or data communications protocols and for carrying out one or more of the techniques described herein. Memory 840 further stores program data 844 as well as buffered traffic data received from mobile terminals via network interface 850, and also stores various parameters, pre-determined threshold values, and/or other program data for controlling the general operation of the RNC 800.

Figure 9:
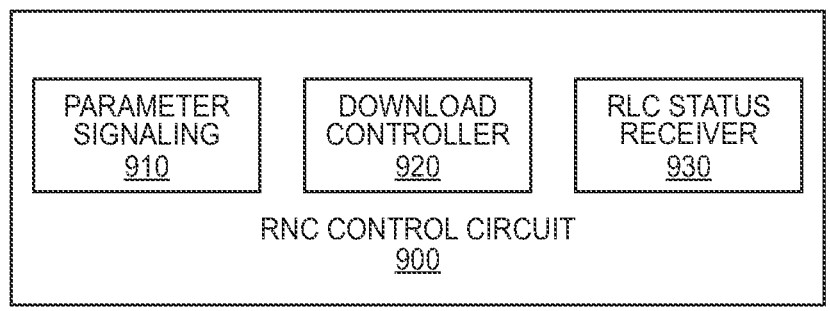
FIG. 9 illustrates an RNC control circuit according to some embodiments of the present invention.

In various embodiments, processing circuits 830, using appropriate program code 842 stored in memory 840, are configured to implement one or more of the techniques described herein. Of course, not all of the steps of these techniques are necessarily performed in a single microprocessor or even in a single module. Thus, FIG. 9 presents a more generalized view of a RNC control circuit 900 configured to carry out one or several of the flow-control techniques described herein. This RNC control circuit 900 may have a physical configuration that corresponds directly to processing circuits 830, for example, or may be embodied in two or more modules or units. In any case, however, RNC control circuit 900 is configured with modules or sub-circuits to implement at least three interrelated operations, which are pictured in FIG. 9 as parameter signaling unit 910, downlink controller 920, and RLC status receiver 930.

Parameter signaling unit 910 sends one or more RLC reporting rate parameters to mobile terminals. In some embodiments, parameter signaling unit 910 sends only a throughput threshold value to one or more mobile terminals. In others, parameter signaling unit may send one or several TSP values to the mobile terminals. Downlink controller 920 controls the transmission of downlink data to the mobile terminals, based, among other things, on RLC status reports received from the mobile terminals. These RLC status reports are received by RLC status receiver 930, at rates that depend on downlink data throughputs for the mobile terminals.

One advantage flowing from various embodiments of the techniques described above is that these techniques allow both the higher bit rates associated with 8C-HSDPA while ensuring that the loss of uplink capacity associated with frequent uplink status reporting is minimized. One problem with a short TSP setting is that the frequently transmitted uplink RLC status reporting increases the unnecessary uplink bit rate which, given that the uplink is non-orthogonal, creates unnecessary cell interference. This in turn decreases cell capacity. However, it should be noted that the TSP threshold functionality ensures that the majority of the RLC status reporting in the cell will be done at the lower reporting rate and that the short TSP setting will only be used in high downlink bit rate scenarios which involve just one or very few users. Another advantage to several of the approaches described above is that only minor modifications to the 3GPP standard are required.

As shown in detail above, embodiments of the present invention include various methods, carried out at a mobile terminal (UE), Radio Network Controller (RNC), or some combination thereof. More generally, these methods may be carried out at an RLC receiver, RLC transmitter, or some combination thereof. Other embodiments include devices or apparatus configured to carry out all or part of one or more of these methods, e.g., with appropriate processing circuits, network interface circuits, and software and/or firmware.

In several variants of the above embodiments, one or several of the first, second, or third parameters is pre-configured in the mobile terminal, e.g., statically programmed, but the mobile terminal is configured to behave in the same manner with respect to selecting between first and second status-prohibit timer settings based on estimated throughput. In other variants, a specific throughput threshold value is neither signaled nor pre-configured, but the mobile terminal is configured to instead calculate a value for a status-prohibit time or, equivalently, a status reporting rate, as a function of the estimated throughput and one or more status-prohibit timer values. In some of these variants, a status-prohibit timer value is interpolated between two status-prohibit timer values, either or both of which may be signaled or pre-configured, using a pre-determined linear interpolation function based on the estimated throughput. In other variants, a non-linear function, such as a step-wise linear function, may be used.

In still other variants, more than one threshold value can be signaled or pre-configured, in which case the multiple threshold values can be used to select from among three or more RLC status update rates. For example, a low threshold value and a high threshold values may be signaled to a UE, which uses a first value for the status-prohibit timer if the estimated throughput is less than the low threshold value, a second value for the status-prohibit timer if the estimated throughput is between the low and high threshold values, and a third value for the status-prohibit timer if the estimated throughput is greater than the high threshold value. In yet another variant of this approach, the status-prohibit timer may be interpolated between a high and low value, based on the estimated throughput, when the estimated throughput falls between the low and high threshold values, and set at a high or low value if the estimated throughput value is below the low threshold value or above the high threshold value, respectively.

In any of the embodiments described above, the throughput estimate may be an estimate of actual RLC throughput, where RLC throughput is interpreted as the throughput at the RLC Service Data Unit (SDU) level, i.e. with RLC protocol header overhead removed. In this case, the RLC throughput can be calculated as an average data rate based on the number of bits contained in the RLC SDU's received by the UE over a predetermined time period. This throughput estimate could be calculated for each transmit-time interval (TTI), for example, or over a longer period, such as every 50 ms. Alternatively, a coarser estimate based on the transport block size sent to the UE may be used, which can be derived in a similar manner but using the number of bits in received transport blocks instead of the number of bits contained in RLC SDUs.

Thus, examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. For example, while various embodiments of the invention have disclosed that the rate at which to send radio link control status reports can be determined based on a throughput estimate, persons skilled in the art will appreciate that this determination could additionally or alternatively be based on one or several network operating conditions pertaining to the mobile terminal, including, for example, the number of carriers configured and/or activated for the mobile terminal, current modulation techniques (e.g., 16-QAM or 64-QAM), and/or a current downlink transmission mode, such as whether Multiple-Input Multiple-Output (MIMO) techniques are being used. In other words, a method performed in a mobile terminal for signaling radio link control status reports to a wireless network node may comprise, for example, determining a RLC status reporting rate based on one or several of these operating conditions applicable to a mobile terminal, in addition to or alternatively to determining the rate based on a throughput estimate of for data transmissions to the mobile terminal. As is readily appreciated by a person skilled in the art, other embodiments than the ones disclosed above are equally possible within the scope of the invention, as defined by the appended patent claims. The present embodiments are thus to be considered in all respects as illustrative of the invention, and not restrictive, and the scope of the invention limited only by the appended claims.

What is claimed is:

1. A method performed in a mobile terminal for signaling radio link control status reports to a wireless network node, the method comprising:
   calculating a throughput estimate for data transmissions to the mobile terminal;
   receiving a threshold value from the wireless network node;
   determining, based on the throughput estimate, a single rate at which radio link control status reports are to be sent from the mobile terminal,
      wherein the single rate indicates a time between radio link control status reports or a frequency of reporting the radio link control status reports;
      wherein the determining the single rate comprises selecting the single rate by selecting one of a plurality of values for a prohibit timer, the plurality of values comprising a first value for selection when the throughput estimate is above the threshold value and a second value, different from the first value, for selection when the throughput estimate is below the threshold value; and
      wherein the prohibit timer prohibits sending of all radio link control status reports for a certain amount of time; and
   sending a plurality of radio link control status reports to the wireless network node at the determined single rate, wherein one or more of the plurality of radio link control status reports report at least one data transmission to the mobile terminal was defective, and one or more of the plurality of radio link control status reports report at least one data transmission to the mobile terminal was successfully received by the mobile terminal.

2. The method of claim 1, further comprising receiving at least two timer-status-prohibit values from the wireless network node prior to said selecting, wherein the at least two timer-status-prohibit values comprise the first value and the second value.

3. The method of claim 1, wherein the threshold value is a TSP_Change_Threshold received from a High-Speed Downlink Packet Access (HSDPA) Node B.

4. The method of claim 1, wherein determining the single rate at which to send radio link control status reports comprises calculating a third value of the plurality of values as a function of the estimated throughput and at least the first value or the second value.

5. The method of claim 4, wherein determining the single rate comprises selecting the third value for the prohibit timer based on varying the rate linearly between the first value and the second value as a function of the estimated throughput, the first value and the second value.

6. The method of claim 5, wherein determining the single rate comprises selecting a third value for the prohibit timer based on varying the rate linearly between the first value and the second value, as a function of the estimated throughput, the first value, the second value, and at least two different reference throughput rates statistically configured by the mobile terminal.

7. The method of claim 5, wherein determining the single rate comprises selecting a third value for the prohibit timer based on varying the rate linearly between the first value and the second value, as a function of the estimated throughput, the first value, the second value, and at least two different reference throughput rates signaled to the mobile terminal.

8. The method of claim 4, wherein the calculating the third value is selectively performed by the mobile terminal responsive to a configuration from the wireless network node.

9. The method of claim 5, further comprising receiving the first value and the second value from the wireless network node prior to said calculating.

10. The method of claim 1, wherein calculating a throughput estimate comprises calculating an actual radio link control throughput based on data sent to the mobile terminal.

11. The method of claim 1, wherein calculating a throughput estimate comprises estimating a radio link control throughput based on one or more transport block sizes for data sent to the mobile terminal.

12. The method of claim 1, wherein data transmission from the wireless node to the mobile terminal comprise a plurality of data packets, and one or more of the radio link control status reports comprise status information about all data packets received since the sending of the last status report.

13. The method of claim 1,
wherein a first one of the plurality of radio link control status reports reports for the first time at least one data transmission to the mobile terminal was defective;
wherein a second and immediately subsequent one of the plurality of reports reports for the first time at least a second data transmission to the mobile terminal was defective; and
wherein the data of the first and second data transmissions are different.

14. A method performed in a wireless network node for controlling the transmission of radio link control status reports from one or more mobile terminals, the method comprising:
signaling a throughput threshold value to one or more mobile terminals; and
receiving radio link control status reports from the one or more mobile terminals at respective different rates, depending on respective downlink data throughput estimates for the one or more mobile terminals;
wherein a rate at which radio link control status reports are received from a given one of the mobile terminals comprises a single rate at which radio link control status reports are sent from the given mobile terminal;
wherein the single rate indicates a time between radio link control status reports or a frequency of reporting the radio link control status reports, and wherein the single rate is defined by a value selected for a prohibit timer, selected by the given one of the one or more mobile terminals, from a plurality of values, wherein the prohibit timer prohibits sending of all radio link control status reports for a certain amount of time;
wherein the plurality of values comprise a first value for selection when a respective downlink data throughput estimate for the given one of the one or more mobile terminals is above the throughput threshold value and a second value, different from the first value, for selection when a respective downlink data throughput estimate for the given one of the one or more mobile terminals is below the throughput threshold value; and
wherein one or more of the radio link control status reports received at the single rate from the given one of the mobile terminals report at least one data transmission to the given one of the mobile terminals was defective, and one or more of the radio link control status reports received at the single rate from the given one of the mobile terminals report at least one data transmission to the given one of the mobile terminals was successfully received by that mobile terminal.

15. The method of claim 14, further comprising signaling at least one timer-status-prohibit value to the one or more mobile terminals, for use in determining status reporting rates.

16. The method of claim 15, wherein signaling at least one timer-status-prohibit value comprises signaling the first value and the second value, and wherein each of the respective different rates corresponds to one or the other of the first value and the second value.

17. The method of claim 15, wherein signaling at least one timer-status-prohibit value comprises signaling the first value and the second value, and wherein each of the respective different rates corresponds to different values in a range between the first value and the second value.

18. The method of claim 14, wherein the method further comprises configuring the given one of the one or more mobile terminals to selectively calculate a third value for the prohibit timer, wherein the third value is calculated as a function of the estimated throughput, the first value, and the second value.

19. The method of claim 18, wherein the third value is calculated as a function of the estimated throughput, the first value, and the second value, and at least two different reference throughput rates.

20. A mobile terminal configured to signal radio link control status reports to a wireless network node, the mobile terminal comprising:
a receiver circuit configured to receive a threshold value from the wireless network node,
a transmitter circuit, and
one or more processing circuits configured to:
calculate a throughput estimate for data transmissions to the mobile terminal;
determine, based on the throughput estimate, a single rate at which radio link control status reports are to be sent from the mobile terminal,
wherein the single rate indicates a time between radio link control status reports or a frequency of reporting the radio link control status reports;
wherein the determining the single rate comprises selecting the single rate by selecting one of a plurality of values for a prohibit timer, the plurality of values comprising a first value for selection when the throughput estimate is above the threshold value and a second value, different from the first value, for selection when the throughput estimate is below the threshold value; and
wherein the prohibit timer prohibits sending of all radio link control status reports for a certain amount of time; and
send a plurality of radio link control status reports to the wireless network node at the determined single rate, wherein one or more of the plurality of radio link control status reports report at least one data transmission to the mobile terminal was defective, and one or more of the plurality of radio link control status reports report at least one data transmission to the mobile terminal was successfully received by the mobile terminal.

21. The mobile terminal of claim 20, wherein the one or more processing circuits are further configured to receive the at least two timer-status-prohibit values from the wireless network node prior to said selecting, wherein the at least two timer-status prohibit values comprise the first value and the second value.

22. The mobile terminal of claim 20, wherein the threshold value is a TSP_Change_Threshold received from a High-Speed Downlink Packet Access (HSDPA) Node B.

23. The mobile terminal of claim 20, wherein the one or more processing circuits are configured to determine the single rate at which to send radio link control status reports by calculating a third value of the plurality of values as a function of the estimated throughput and at least the first value or the second value.

24. The mobile terminal of claim 23, wherein the one or more processing circuits are configured to determine the single rate by selecting the third value for the prohibit timer based on varying the rate linearly between the first value and the second value as a function of the estimated throughput, the first value and the second value.

25. The mobile terminal of claim 24, wherein the one or more processing circuits are further configured to receive the first value and the second value from the wireless network node prior to said calculating.

26. The mobile terminal of claim 20, wherein the one or more processing circuits are configured to calculate a throughput estimate by calculating an actual radio link control throughput based on data sent to the mobile terminal.

27. The mobile terminal of claim 20, wherein the one or more processing circuits are configured to calculate a throughput estimate by estimating a radio link control throughput based on one or more transport block sizes for data sent to the mobile terminal.

28. A wireless network node configured to control the transmission of radio link control status reports from one or more mobile terminals, the wireless network node comprising a network interface circuit for communicating with one or more base stations and further comprising one or more processing circuits configured to:
　signal a throughput threshold value to one or more mobile terminals; and
　receive radio link control status reports from the one or more mobile terminals at respective different rates, depending on respective downlink data throughput estimates for the one or more mobile terminals;
　wherein a rate at which radio link control status reports are received from a given one of the mobile terminals comprises a single rate at which radio link control status reports are sent from the given mobile terminal;
　wherein the single rate indicates a time between radio link control status reports or a frequency of reporting the radio link control status reports, and wherein the single rate is defined by a value selected for a prohibit timer, selected by the given one of the one or more mobile terminals, from a plurality of values, wherein the prohibit timer prohibits sending of all radio link control status reports for a certain amount of time;
　wherein the plurality of values comprise a first value for selection when a respective downlink data throughput estimate for the given one of the one or more mobile terminals is above the throughput threshold value and a second value, different from the first value, for selection when a respective downlink data throughput estimate for the given one of the one or more mobile terminals is below the throughput threshold value; and
　wherein one or more of the radio link control status reports received at the single rate from the given one of the mobile terminals report at least one data transmission to the given one of the mobile terminals was defective, and one or more of the radio link control status reports received at the single rate from the given one of the mobile terminals report at least one data transmission to the given one of the mobile terminals was successfully received by that mobile terminal.

29. The wireless network node of claim 28, wherein the one or more processing circuits are further configured to signal at least one timer-status-prohibit value to the one or more mobile terminals, for use in determining status reporting rates.

30. The wireless network node of claim 29, wherein the one or more processing circuits are configured to signal the first value and the second value, and wherein each of the respective different rates corresponds to one or the other of the first value and the second value.

31. The wireless network node of claim 29, wherein the one or more processing circuits are configured to signal the first value and the second value, and wherein each of the respective different rates corresponds to different values in a range between the first value and the second value.

32. A mobile terminal for signaling radio link control status reports to a wireless network node, the mobile terminal comprising:
　a throughput estimator circuit configured to calculate a throughput estimate for data transmissions to the mobile terminal;
　a report rate selector circuit configured to determine, based on the throughput estimate, a single rate at which radio link control status reports are to be sent from the mobile terminal,
　　wherein the single rate indicates a time between radio link control status reports or a frequency of reporting the radio link control status reports;
　　wherein the report rate selector circuit is configured to determine the single rate by selecting one of a plurality of values for a prohibit timer, the plurality of values comprising a first value for selection when the throughput estimate is above a threshold value from the wireless network node and a second value, different from the first value, for selection when the throughput estimate is below the threshold value; and
　　wherein the prohibit timer prohibits sending of all radio link control status reports for a certain amount of time; and
　a radio controller circuit configured to receive the threshold value from the wireless network node and send a plurality of radio link control status reports to the wireless network node at the determined single rate, wherein one or more of the plurality of radio link control status reports report at least one data transmission to the mobile terminal was defective, and one or more of the plurality of radio link control status reports report at least one data transmission to the mobile terminal was successfully received by the mobile terminal.

33. A wireless network node for controlling the transmission of radio link control status reports from one or more mobile terminals, the wireless network node comprising:
- a parameter signaling circuit configured to signal a throughput threshold value to one or more mobile terminals; and
- a radio link control status receiver configured to receive radio link control status reports from the one or more mobile terminals at different rates, depending on respective downlink data throughputs for the one or more mobile terminals;
- wherein a rate at which radio link control status reports are received from a given one of the mobile terminals comprises a single rate at which radio link control status reports are sent from the given mobile terminal;
- wherein the single rate indicates a time between radio link control status reports or a frequency of reporting the radio link control status reports, and wherein the single rate is defined by a value selected for a prohibit timer, selected by the given one of the one or more mobile terminals, from a plurality of values, wherein the prohibit timer prohibits sending of all radio link control status reports for a certain amount of time;
- wherein the plurality of values comprise a first value for selection when a respective downlink data throughput estimate for the given one of the one or more mobile terminals is above the throughput threshold value and a second value, different from the first value, for selection when a respective downlink data throughput estimate for the given one of the one or more mobile terminals is below the throughput threshold value; and
- wherein one or more of the radio link control status reports received at the single rate from the given one of the mobile terminals report at least one data transmission to the given one of the mobile terminals was defective, and one or more of the radio link control status reports received at the single rate from the given one of the mobile terminals report at least one data transmission to the given one of the mobile terminals was successfully received by that mobile terminal.

* * * * *